US010174743B2

(12) United States Patent
Canal Vila et al.

(10) Patent No.: US 10,174,743 B2
(45) Date of Patent: Jan. 8, 2019

(54) WIND TURBINE WITH A WIND SENSING APPARATUS

(71) Applicant: ALSTOM RENEWABLE TECHNOLOGIES, Grenoble (FR)

(72) Inventors: Marc Canal Vila, Barcelona (ES); Jordi Armet Unzeta, Sant Celoni (ES)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 571 days.

(21) Appl. No.: 14/497,203

(22) Filed: Sep. 25, 2014

(65) Prior Publication Data

US 2015/0093243 A1    Apr. 2, 2015

(30) Foreign Application Priority Data

Sep. 30, 2013  (EP) ..................................... 13382377

(51) Int. Cl.
*F03D 7/04*      (2006.01)
*F03D 17/00*     (2016.01)

(52) U.S. Cl.
CPC ............ *F03D 7/048* (2013.01); *F03D 17/00* (2016.05); *F05B 2270/322* (2013.01); *F05B 2270/806* (2013.01); *F05B 2270/8042* (2013.01); *Y02E 10/723* (2013.01)

(58) Field of Classification Search
CPC . F03D 7/048; F03D 7/02; F03D 7/042; F03D 17/00; Y02E 10/723; F05B 2270/80; F05B 2270/806; F05B 2270/7042; F05B 2270/322; F05B 2270/32; F05B 2270/321
USPC ...................................................... 415/118
See application file for complete search history.

(56) References Cited

U.S. PATENT DOCUMENTS

| 7,025,567 | B2* | 4/2006 | Wobben | F03D 7/0224 |
| | | | | 415/118 |
| 7,281,891 | B2* | 10/2007 | Smith | F03D 7/0224 |
| | | | | 290/55 |
| 2006/0131889 | A1* | 6/2006 | Corten | F03D 1/04 |
| | | | | 290/43 |
| 2011/0084486 | A1 | 4/2011 | Yoneda et al. | |
| 2013/0017086 | A1* | 1/2013 | Till | F03D 17/00 |
| | | | | 416/61 |
| 2013/0094961 | A1 | 4/2013 | Couchman et al. | |
| 2013/0149145 | A1* | 6/2013 | Shibata | F03D 80/40 |
| | | | | 416/1 |

FOREIGN PATENT DOCUMENTS

| DE | 10 2006 041 461 | 3/2008 |
| GB | 2481461 | 12/2011 |
| JP | 2006-125265 | 5/2006 |

OTHER PUBLICATIONS

Hirakata, English Machine Translation of JP 2006 125265, Translated by ProQuest Dialogue Jan. 8, 2017.*
Bosselmann, English Machine Translation of DE 10 2006 041461, Translated by ProQuest Dialogue Jan. 8, 2017.*
European Extended Search Report for Application No. EP13382377.3, dated Feb. 27, 2014, 6 pgs.

* cited by examiner

*Primary Examiner* — David E Sosnowski
*Assistant Examiner* — Wayne A Lambert
(74) *Attorney, Agent, or Firm* — Dority & Manning, P.A.

(57) ABSTRACT

A wind turbine including a rotor, a nacelle, a support structure for the nacelle and at least one wind sensing apparatus mounted on the support structure.

8 Claims, 6 Drawing Sheets

WIND TURBINE WITH A WIND SENSING APPARATUS

This application claims the benefit of European Patent Application EP13382377.3 filed Sep. 30, 2013, the entire contents of which are hereby incorporated by reference in its entirety for all purposes.

The present disclosure relates to wind turbines and wind anemometry.

BACKGROUND ART

The performance of wind turbines is affected by turbulent wind conditions that cause structural loads on the wind turbine and its components. Currently, structural loads may be reduced by measuring incoming wind speed and wind turbulence in front of the wind turbine with remote wind sensing apparatuses. The data gathered by the wind sensing apparatuses may be used by feed-forward wind turbine controllers to proactively compensate for wind velocity and direction changes prior to impingement of the air flow on the wind turbine e.g. by adjusting the yaw of the nacelle and pitch angle of the blades to protect components and maximize the performance of the wind turbine.

A number of optical and acoustic methods allow remote measurement of wind speed in the atmosphere. These include the technique of light detecting and ranging (LIDAR), also referred to as coherent laser radar (CLR) and coherent Doppler LIDAR (CDL). LIDAR involves the emission of a coherent light beam and detection of the weak return reflected or scattered from a distant target. The technique provides a way to measure the line-of-sight component of wind speed via detection of the Doppler shift for light backscattered from natural aerosols (particles of dust, pollen, droplets, etc.) in the atmosphere.

Sonic detecting and ranging (SODAR) is another commonly used Doppler-based method of remote atmospheric wind profiling. It involves the emission of sound pulses and relies on the detection of the weak echo scattered from temperature and velocity fluctuations in the atmosphere. It measures the wind velocity via the Doppler shift of the acoustic pulses in a manner analogous to LIDAR.

Several LIDAR or SODAR mounting positioning options in wind turbines are currently known. A LIDAR may be mounted on the nacelle facing the incoming wind. However, the restricted field of view caused by the rotating blades of the turbine results in only approximately 75% of measurements being successful, with the laser beam striking a blade in the remaining 25% of cases. For the same reason, it takes longer to gather measurements. It is also known that a rearward-facing LIDAR may be mounted on the nacelle on a pan-and-tilt scanner to measure wake wind speed deficit and wander.

Mounting the LIDAR on the hub overcomes the restricted field of view of nacelle mounted LIDAR systems, however its installation and maintenance is difficult due the height of the tower and the rotation of the hub.

The accuracy of the measurements taken by remote wind sensing apparatuses mounted on the nacelle or on the hub is furthermore affected by the bending moments and swaying experienced by the wind tower in strong winds.

SODARs are less likely to be mounted on the nacelle or the hub because the noises generated at the nacelle and/or at the hub interfere with the SODAR's sonic signals.

A known approach to overcome the known drawbacks of mounting the LIDAR or a SODAR on the nacelle or the hub is to position the LIDAR or the SODAR on the ground some distance ahead of the wind turbine and directed upwardly to measure wind speed and wind fluctuations of the wind in front of the wind turbine. Although this solution is easily implemented inland, it is very costly to implement offshore as it would require building a separate offshore platform to carry the remote wind sensing apparatus.

In general, it is known that the turbulent movements in the wind will evolve between the time they are measured and when they reach the turbine, causing errors in the preview wind measurements. In addition, the rotor blades have the effect of slowing down the mean velocity of the incoming wind near the rotor and further altering the turbulence characteristics. A full and detailed interpretation of these events is difficult since the wind field is currently being probed only along a single line, and hence no information can be obtained on the transverse structure of the gusts.

There therefore is a need to further improve wind measurement systems for wind turbines.

SUMMARY

In one aspect, this invention discloses a wind turbine comprising a rotor, a nacelle, a support structure for the nacelle and at least one wind sensing apparatus mounted on the support structure.

In this aspect, the wind sensing apparatus may be more easily accessible for maintenance than in prior art solutions. Particularly in offshore applications, no separate structures would be needed for housing or supporting wind sensing apparatus and additionally the accuracy of wind measurements may be improved compared to some prior art systems. Furthermore, if placed low enough, the blades will not affect the measurements either.

In some embodiments, the wind sensing apparatus may be moveably mounted on the support structure such that the wind sensing apparatus is moveable along a surface of the support structure. Optionally, the wind sensing apparatus may be moveable along a circumference of the support structure. The remote wind sensing apparatus may measure the speed and fluctuations of the wind at up to 360 degrees around the wind turbine and not only the incoming wind or the outgoing wake.

In some embodiments, the wind sensing apparatus may use the Doppler Effect to measure wind speed and wind fluctuations at a distance, which may comprise at least one light detection and ranging (LIDAR) apparatus and/or at least one sonic detection and ranging (SODAR) apparatus.

In some embodiments, the nacelle's support structure may comprise a standalone tower and, in other embodiments, the support structure may also comprise a substructure below the tower. The at least one wind sensing apparatus may be moveably mounted on the support structure, either on the tower or on the substructure below the tower, and, in some embodiments, substantially near the base of the tower.

By positioning the remote wind sensing apparatus substantially near the base of the tower, the accuracy of the measurements of the remote wind sensing apparatus will not be affected by the bending moments and swaying experienced by the upper portion of the tower under strong winds. Furthermore, mounting and maintaining the remote wind sensing apparatus at the base of the tower is easier than doing so on the nacelle or on the hub.

In most embodiments, the wind turbine may comprise one or more mechanisms for moving the wind sensing apparatus along a surface of the support structure, i.e. the wind sensing apparatus may be moveable along a horizontal and a vertical axis of the support structure. Furthermore the wind sensing apparatus may comprise a pan-and-tilt scanning capability, i.e. from any point along the surface of the support structure the wind sensing apparatus may be further rotatable around its own horizontal and vertical axis to further broaden the areas and directions around the wind turbine in which wind speed and wind turbulence may be measured.

In some embodiments, the wind turbine may be located offshore. An aspect of having the wind sensing apparatus mounted to the support structure is that there is no requirement for an additional costly marine platform which makes the remote wind sensing apparatus equally easy to install and maintain inland as it is offshore.

In some embodiments, the wind turbine may comprise a positioning controller for moving the at least one wind sensing apparatus along a surface of the tower and/or a control system for controlling parameters of the wind turbine in response to data captured by the at least one wind sensing apparatus.

In another embodiment, a wind park may comprise a plurality of wind turbines with wind sensing apparatuses moveably mounted to their support structures and a central positioning controller for moving one or more wind sensing apparatuses along the surface of the support structures of one or more wind turbines.

Thereby, the remote wind sensing apparatuses on one or more wind turbines may be managed to measure wind speed and wind fluctuations in multiple directions and, hence, provide a detailed interpretation of wind evolution and the transverse structure of gusts of wind around the wind turbines.

In one embodiment, the wind park may also comprise a central control system for controlling parameters of one or more wind turbines in response to data captured by one or more wind sensing apparatuses from one or more wind turbines located nearby. Such a central control system may be e.g. a SCADA system.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
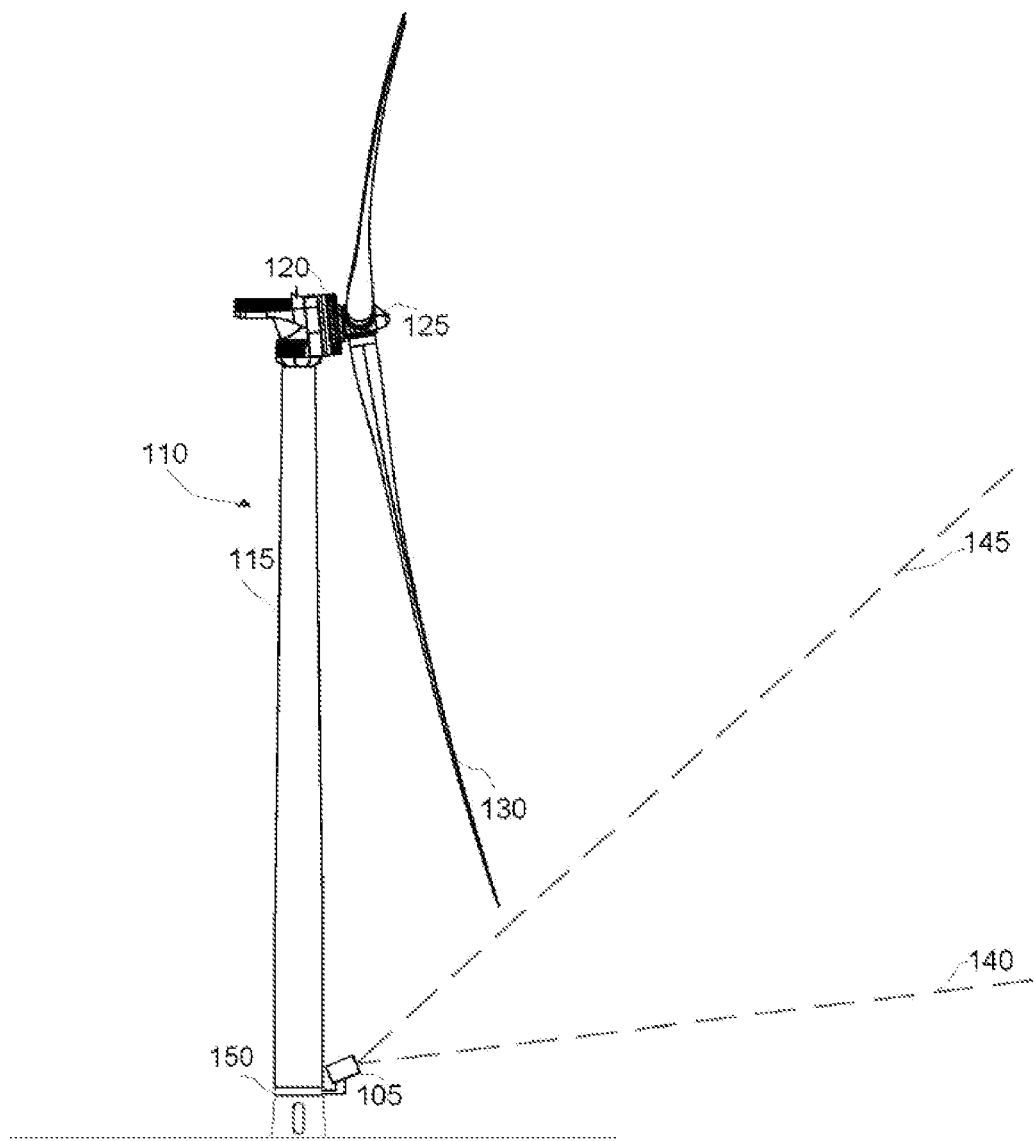
FIG. 1 illustrates an embodiment of the present invention.

FIG. 1 illustrates an embodiment of a wind turbine according to the present invention. The wind turbine 110 comprises a tower 115, a nacelle 120, a rotor 125 and rotor blades 130. The LIDAR 105 is moveably mounted around the circumference of the tower on a guiding rail 150 at the base of the tower and is forward-facing for measuring incoming wind speed and fluctuations. The vertical scanning range of the LIDAR is illustrated with a lower limit 140 which may be substantially horizontal and an upper limit 145 which may be limited by the lowest travel path of the rotor blades.

The wind sensing apparatus for measuring wind fluctuations and wind speed in the atmosphere may use the Doppler Effect. Such remote wind sensing apparatuses may comprise LIDARs and/or SODARs. These wind sensing apparatuses may be moveably mounted to the tower base with the aid of a platform with horizontal and/or vertical mechanisms for moveably mounting it to the support structure e.g. guiding rails. The wind sensing apparatus may be remotely controlled to move along the surface of the support structure by a positioning controller. The wind turbine may comprise a parameter management system for managing the variable parameters of the wind turbine in response to data captured by the at least one wind sensing apparatus.

Figure 2:
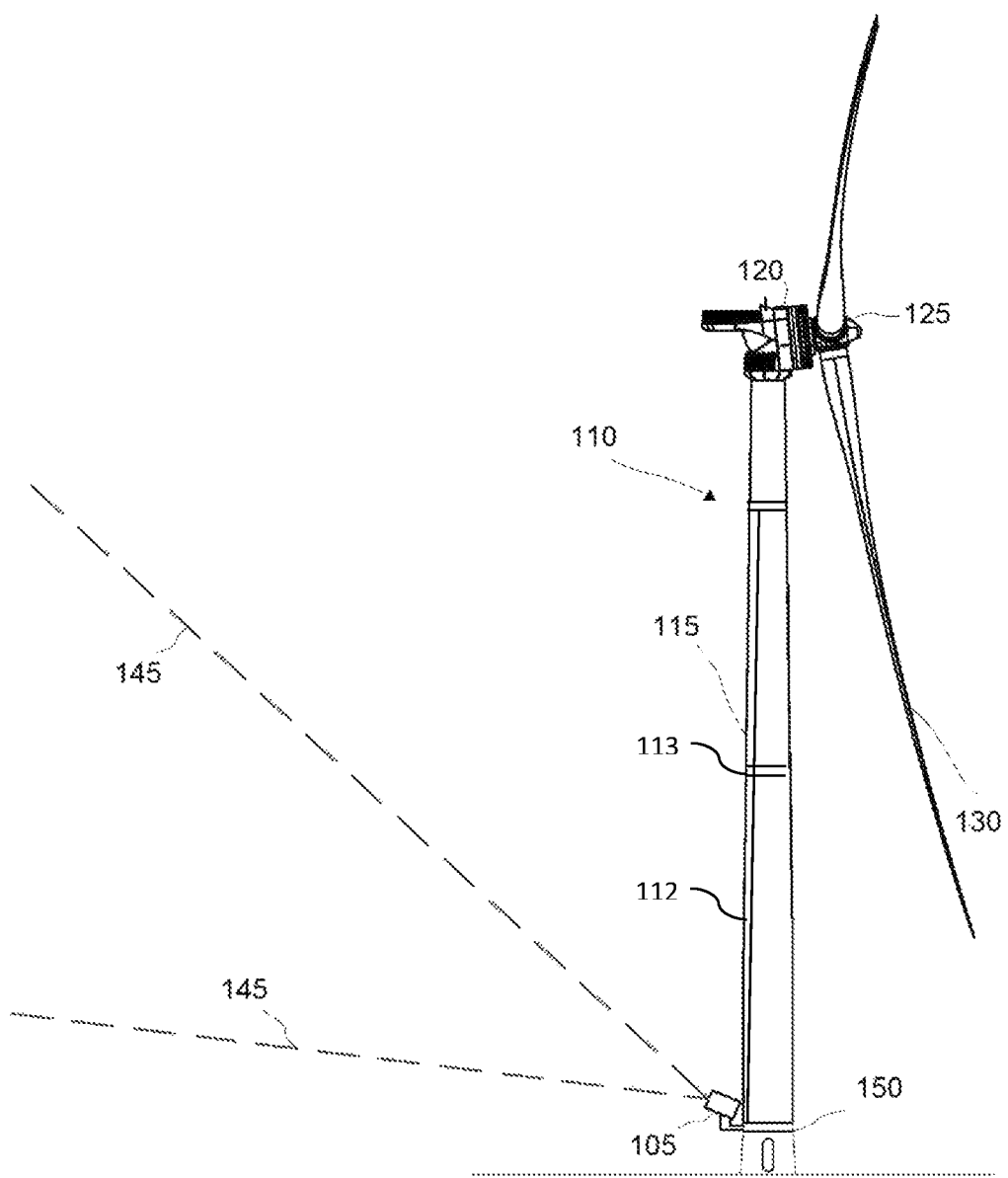
FIG. 2 illustrates another view of the embodiment of FIG. 1.

FIG. 2 illustrates another view of the wind turbine depicted in FIG. 1. The wind turbine in FIG. 2 is similar to the wind turbine in FIG. 1 with the exception that the wind sensing apparatus 105 has been moved along the guide rail 150 at the base of the tower in order to be rearward-facing for measuring wake wind deficit and wander. The vertical scanning range of the wind sensing apparatus is illustrated with a lower limit 140 which may be substantially horizontal and an upper limit 145 which is not limited by the rotor blades and, therefore, could be substantially vertical.

Furthermore, when the movable wind sensing apparatus is rearward-facing or side-facing, it may additionally be moved vertically along the height of the tower, as indicated in FIG. 2, because neither the wind sensing apparatus' movement along the surface nor the scanning paths are obstructed by the rotor blades. The wind sensing apparatus may be mounted and moved along the surface of the support structure with a suitable mechanism, such as, for example vertical guide rails 112 as depicted in FIG. 2. These vertical guide rails 112 could be combined in some embodiments with a plurality of circumferential rails 113. Alternative mechanisms include the use of cables and pulleys or with a robotic carrier capable of moving along the surface of the support structure by gripping the surface or gliding along it while carrying the wind sensing apparatus.

Figure 3:
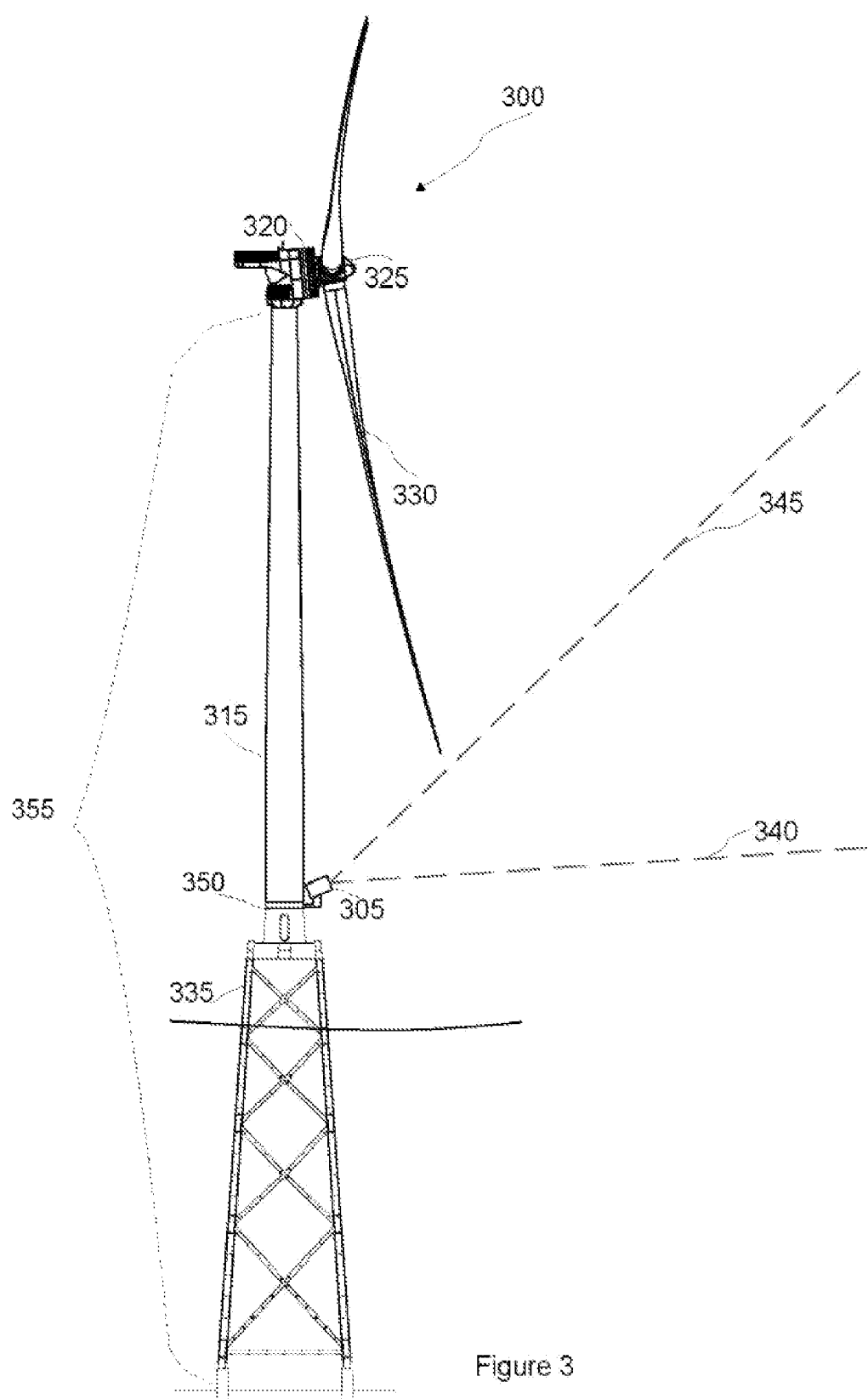
FIG. 3 illustrates a further embodiment of the present invention.

FIG. 3 illustrates a further embodiment of the wind turbine according to the present invention. The wind turbine 300 comprises a rotor 325, rotor blades 330, a nacelle 320 and a support structure 355. The support structure comprises a tower 315 and a substructure 335 below the tower. The moveable wind sensing apparatus 305 is rotatably mounted on the tower, substantially near the base of the tower, and is forward-facing for measuring incoming wind speed and fluctuations. The wind sensing apparatus may be rotated 360 degrees along the circumference of the substructure below the tower in order to measure wind speeds and wind fluctuations in the atmosphere in any direction around the wind turbine. In FIG. 3, the vertical scanning range of the wind sensing apparatus is illustrated with a lower limit 340 which may be substantially horizontal and an upper limit 345 which may be limited by the lowest travel path of the rotor blades 330.

Figure 4:
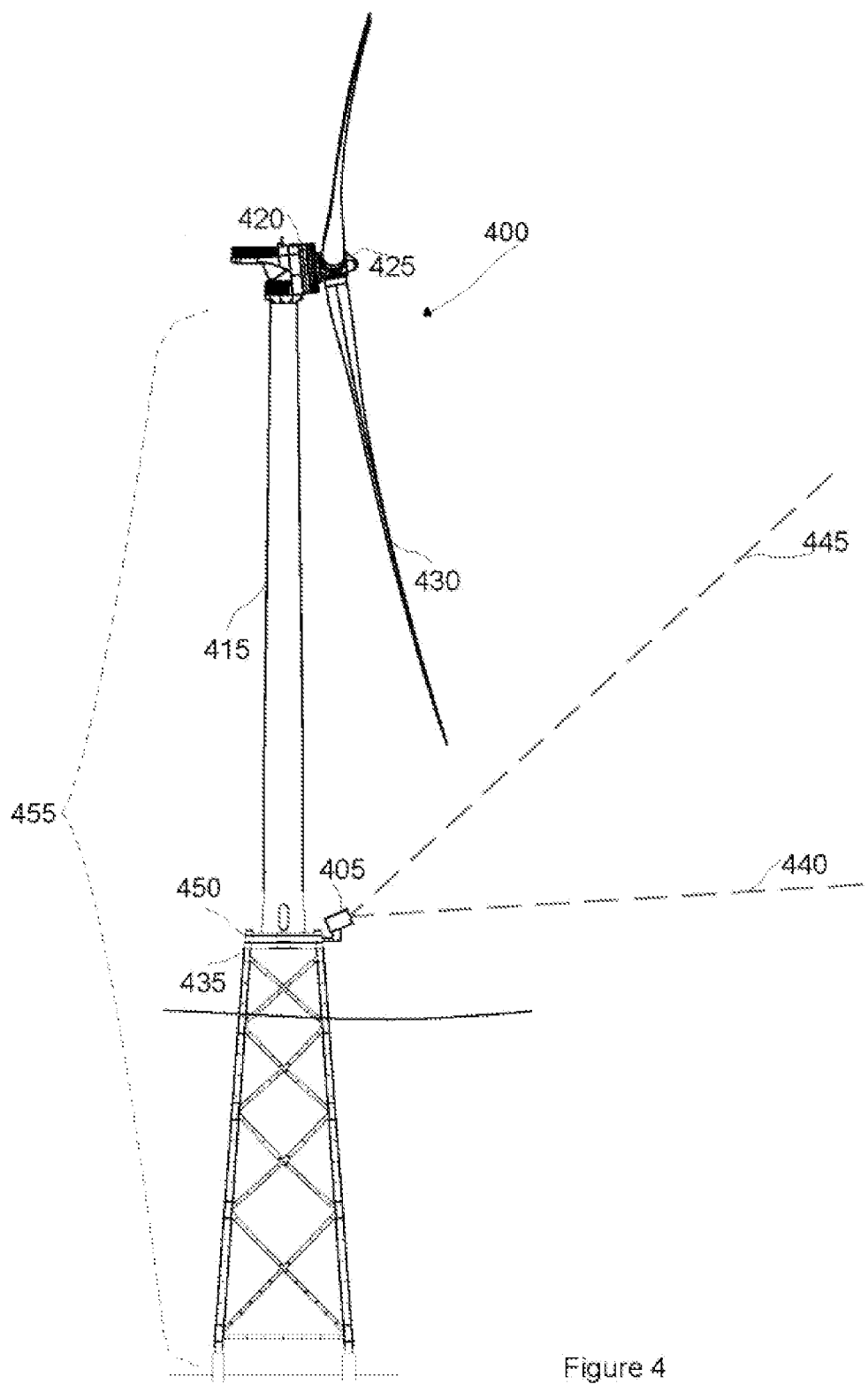
FIG. 4 illustrates yet another embodiment of the present invention.

FIG. 4 illustrates yet another embodiment of a wind turbine according to the present invention. The wind turbine 400 comprises a rotor 425, rotor blades 430, a nacelle 420 and a support structure 455, wherein the support structure comprises a tower 415 and a substructure 435 below the tower. The wind sensing apparatus 405 is rotatably mounted on the substructure below the tower, substantially near the base of the tower, and is forward-facing for measuring incoming wind speed and fluctuations. In such an embodiment, the wind sensing apparatus may be rotated 360 degrees along the circumference of the substructure below the tower in order to measure wind speeds and wind fluctuations in the atmosphere in any direction around the wind turbine. In FIG. 4, the vertical scanning range of the wind sensing apparatus is illustrated with a lower limit 440 which may be substantially horizontal and an upper limit 445 which is limited by the lowest travel path of the rotor blades 430.

Figure 5:
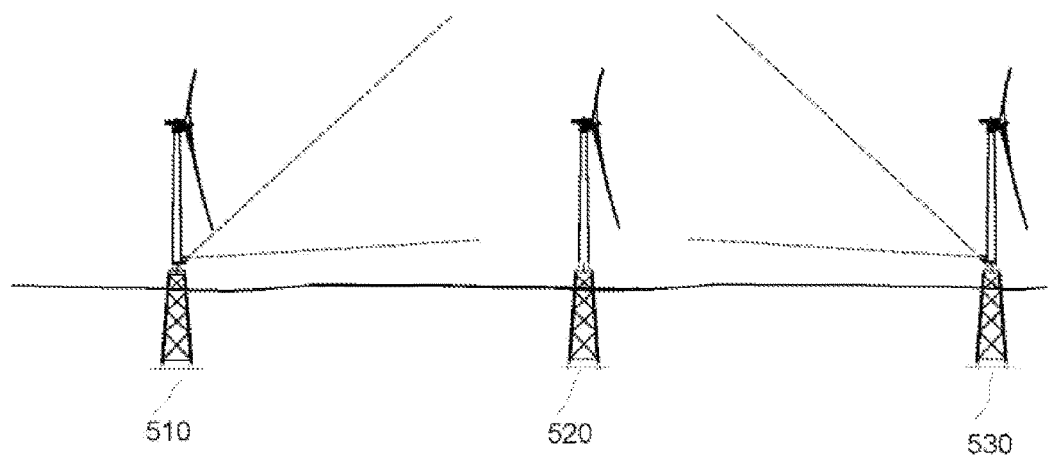
FIG. 5 illustrates yet a further embodiment of the present invention.

FIG. 5 illustrates yet a further embodiment of the wind turbine according to the present invention. The figure depicts a wind park with three offshore wind turbines where the wind sensing apparatus mounted on the support structure of the first wind turbine 510 may be forward-facing towards the second turbine 520 in order to measure the wake wind from the second turbine which is incoming towards the first wind turbine. The wind sensing apparatus mounted on the support structure of the third wind turbine 530 may be rearward-facing towards the second turbine in order to measure the wake wind from the third turbine which is incoming towards the second wind turbine.

Figure 6:
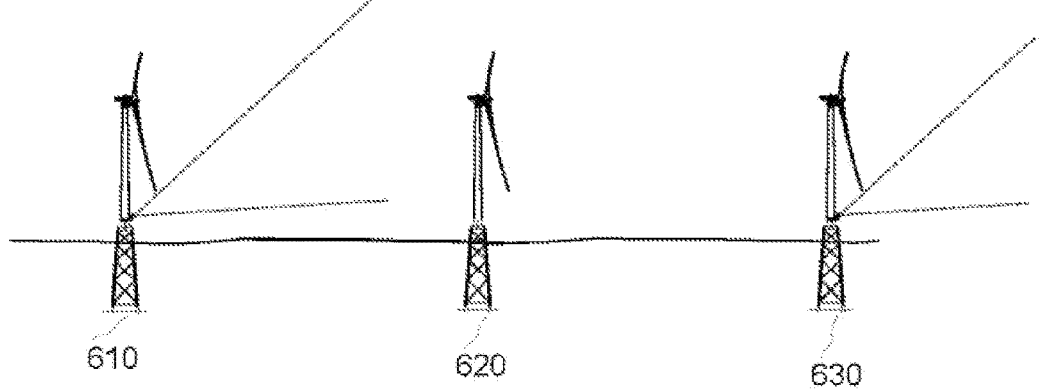
FIG. 6 illustrates an alternative embodiment of the present invention.

FIG. 6 illustrates an alternative embodiment of the wind turbine according to the present invention. FIG. 6 illustrates a wind park with three offshore wind turbines where the wind sensing apparatus mounted on the support structure of the first wind turbine 610 may be forward-facing towards the second turbine 620 in order to measure the wake wind from the second turbine which is incoming towards the first wind turbine whilst the wind sensing apparatus mounted on the support structure of the third wind turbine 630 may be moved to be forward-facing in order to measure the incoming wind towards it.

In both the embodiments of FIGS. 5 and 6, the wind sensing apparatus may be mounted to be movable along a circumference of the support structure (tower) to be able to select where wind flows are to be measured.

Figure 7:
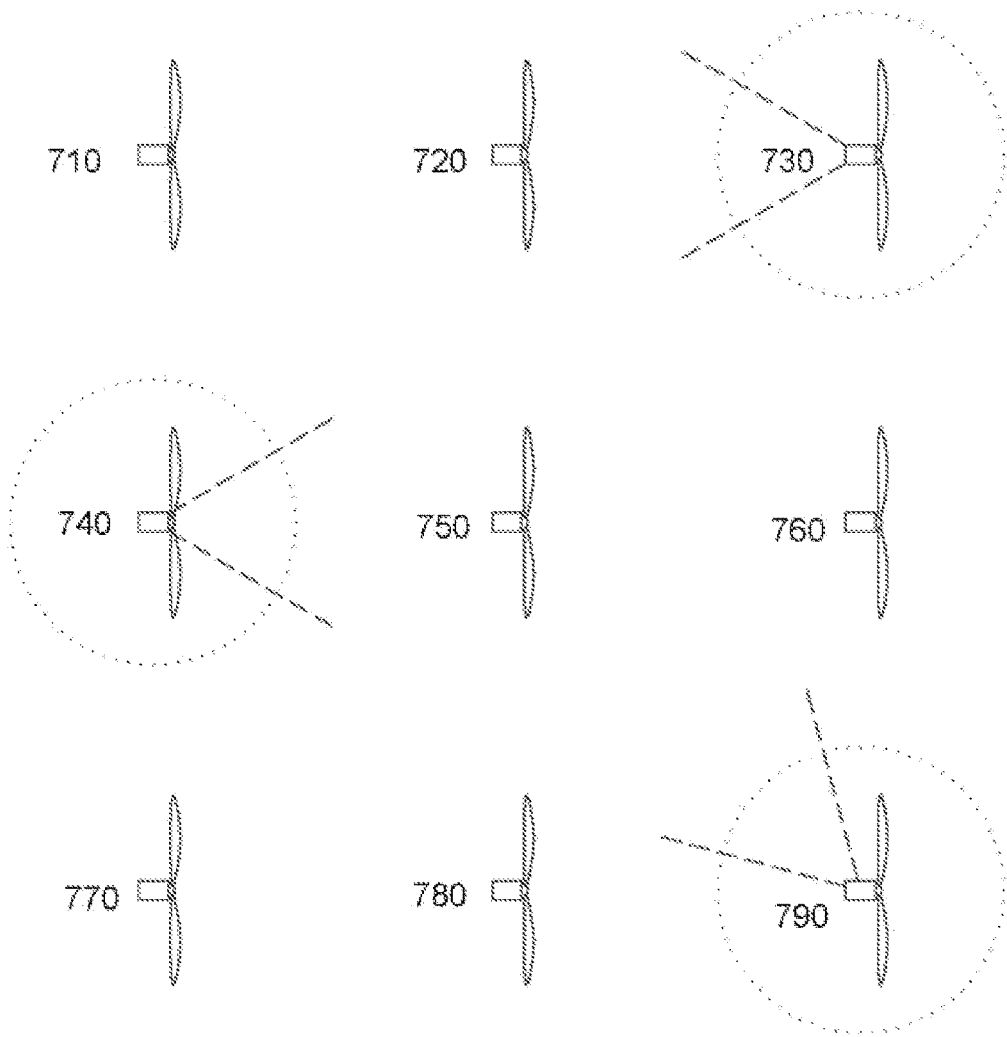
FIG. 7 illustrates another alternative embodiment of the present invention.

FIG. 7 illustrates another alternative embodiment of the wind turbine according to the present invention. FIG. 7 depicts a top-down view of a wind park comprising nine wind turbines (710, 720, 730, 740, 750, 760, 770, 780, 790), which illustrates an embodiment wherein the moveable wind sensing apparatuses of wind turbines 740 and 790 may be turned towards wind turbine 750 in order to measure wind speed, wind fluctuations, wake wind and transversal wind gusts affecting wind turbine 750. At the same time, the wind sensing apparatus moveably mounted on wind turbine 730 may be directed to measure the wake wind from wind turbine 730 which is also the incoming wind to 720. In general, the one or more moveable remote wind sensing apparatuses or wind sensing apparatuses may be moved along the surface of each wind turbine and directed to the area in the atmosphere where the wind speed and wind fluctuations are of interest. Wind measurements taken with a plurality of remote wind sensing apparatuses may provide a detailed interpretation of wind evolution and the transverse structure of gusts of wind around the wind turbines.

The wind park may comprise a central positioning controller for controlling the position of each and all of the moveably mounted wind sensing apparatus in the wind park. Furthermore, the wind park may comprise a central control system for managing various parameters (e.g. pitch angles, generator torque, rotor speed etc.) of the wind turbines located in the wind park in response to data captured by the at least one of the plurality of wind sensing apparatuses mounted on the wind turbines in the park. Such a central control system may be a SCADA system.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine, comprising:
    a rotor with one or more rotor blades configured thereon,
    a nacelle,
    a support structure for the nacelle, the support structure further comprising a tower, and
    at least one wind sensing apparatus mounted on the support structure, wherein the wind sensing apparatus is a light detection and ranging (LIDAR) apparatus;
    wherein the LIDAR apparatus is mounted on the tower adjacent a base of the tower at a height so that an upper limit of a vertical scanning range of the LIDAR apparatus is below a lowest travel path of the rotor blades; and
    wherein the LIDAR apparatus is moveably mounted on the support structure in a vertical direction such that the LIDAR apparatus is vertically moveable along a surface of the tower in one or both of a side-facing position and a rearward-facing position.

2. The wind turbine according to claim 1, wherein the wind sensing apparatus is moveable vertically and along a circumference of the tower via a plurality of circumferential and vertical guide rails.

3. The wind turbine according to claim 1, wherein the wind turbine is located offshore and the support structure comprises a substructure below the tower.

4. The wind turbine according to claim 1, comprising a positioning controller for moving the at least one wind sensing apparatus along a surface of the support structure.

5. The wind turbine according to claim 1, comprising a control system for controlling parameters of the wind turbine in response to data captured by the at least one wind sensing apparatus.

6. A wind park comprising a plurality of wind turbines according to claim 1.

7. The wind park according to claim 6, comprising a central positioning controller for moving one or more of the at least one wind sensing apparatus moveably mounted on the support structures of one or more of the plurality of wind turbines.

8. The wind park according to claim 7, comprising a central control system for controlling parameters of one or more of the plurality of wind turbines in response to data captured by one or more of the at least one wind sensing apparatus.

* * * * *